US009958929B2

(12) United States Patent
Kanematsu

(10) Patent No.: US 9,958,929 B2
(45) Date of Patent: May 1, 2018

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventor: Shinichi Kanematsu, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 14/997,366

(22) Filed: Jan. 15, 2016

(65) Prior Publication Data
US 2016/0132094 A1 May 12, 2016

Related U.S. Application Data

(63) Continuation of application No. 13/925,646, filed on Jun. 24, 2013, now Pat. No. 9,268,392.

(30) Foreign Application Priority Data

Jun. 27, 2012 (JP) ................ 2012-144327

(51) Int. Cl.
G06F 1/32 (2006.01)
G06F 9/44 (2018.01)

(52) U.S. Cl.
CPC .......... G06F 1/3234 (2013.01); G06F 9/4418 (2013.01); Y02B 60/186 (2013.01)

(58) Field of Classification Search
CPC .... G06F 1/3234; G06F 9/4418; Y02B 60/186
See application file for complete search history.

(56) References Cited

U.S. PATENT DOCUMENTS

| 5,666,540 | A | * | 9/1997 | Hagiwara | G06F 9/4418 713/321 |
| 2002/0133695 | A1 | * | 9/2002 | Khatri | G06F 9/4411 713/1 |
| 2005/0240788 | A1 | * | 10/2005 | Satoh | H04N 1/00885 713/323 |
| 2007/0127052 | A1 | * | 6/2007 | Cheng | G06F 11/0742 358/1.14 |
| 2012/0239918 | A1 | * | 9/2012 | Huang | G06F 9/4401 713/2 |

FOREIGN PATENT DOCUMENTS

| JP | H11134284 A | 5/1999 |
| JP | 2000047763 A | 2/2000 |
| JP | 2001-142839 A | 5/2001 |

* cited by examiner

Primary Examiner — Thomas Lee
Assistant Examiner — Vincent Chang
(74) Attorney, Agent, or Firm — Canon U.S.A., Inc. IP Division

(57) ABSTRACT

An information processing apparatus to which an external device is attachable includes an initialization unit configured to, when the information processing apparatus is activated from a power-off state, execute initialization of the external device, and not to, when the information processing apparatus is returned from a power-saving state, execute the initialization of the external device.

11 Claims, 9 Drawing Sheets

INFORMATION PROCESSING APPARATUS, CONTROL METHOD THEREFOR, AND STORAGE MEDIUM

CROSS REFERENCE TO RELATED APPLICATIONS

The present application is a continuation of U.S. patent application Ser. No. 13/925,646, filed Jun. 24, 2013, entitled "INFORMATION PROCESSING APPARATUS, CONTROL METHOD THEREFORE, AND STORAGE MEDIUM", the content of which is expressly incorporated by reference herein in its entirety. Further, the present application claims the benefit of priority from Japanese Patent Application No. 2012-144327 filed Jun. 27, 2012, which is also hereby incorporated by reference herein in its entirety.

BACKGROUND OF THE INVENTION

Field of the Invention

The present invention relates to information processing apparatuses, control methods therefore, and storage media.

Description of the Related Art

In recent years, the starting time of an information processing apparatus has become longer and longer due to an increase in programs.

Under such circumstances, many information processing apparatuses employ a suspending function to shorten the starting time. The suspending function is a technique for increasing the speed of starting at the time of returning from a power-saving mode by continuing the supply of power to a memory during the power-saving mode to retain data (a suspended state) (Japanese Patent Application Laid-Open No. 2005-284491).

However, when a change (installation, removal, addition, replacement, etc.) is made to optional units of an information processing apparatus while the information processing apparatus is in the suspended state, the change may not be detected, so that the information processing apparatus cannot operate normally.

The foregoing occurs because the optional units are not initialized at the time of resume processing returning from the suspended state and, therefore, the change made to the optional units during the suspended state cannot be reflected.

SUMMARY OF THE INVENTION

The present invention is directed to an information processing apparatus capable of operating normally even when a change is made to optional units of the information processing apparatus while the information processing apparatus is in the suspended state.

According to an aspect of the present invention, an information processing apparatus to which an external device is attachable includes an initialization unit configured to, when the information processing apparatus is activated from a power-off state, execute initialization of the external device, and not to, when the information processing apparatus is returned from a power-saving state, execute the initialization of the external device.

Further features of the present invention will become apparent from the following description of exemplary embodiments with reference to the attached drawings.

BRIEF DESCRIPTION OF THE DRAWINGS

FIG. 4 is a flow chart illustrating an operation at the time when a power switch of the image forming apparatus is turned on.

DESCRIPTION OF THE EMBODIMENTS

Exemplary embodiments of the present invention will be described in detail below with reference to the drawings.

Although the following describes an image forming apparatus such as a printer, the exemplary embodiments of the present invention are also applicable to an ordinary information processing apparatus such as a personal computer (PC). Furthermore, although the following describes a reader unit and a printer unit as optional units, the optional units according to the exemplary embodiment of the present invention are also applicable to ordinary optional devices of an information processing apparatus such as an external storage device.

Figure 1:
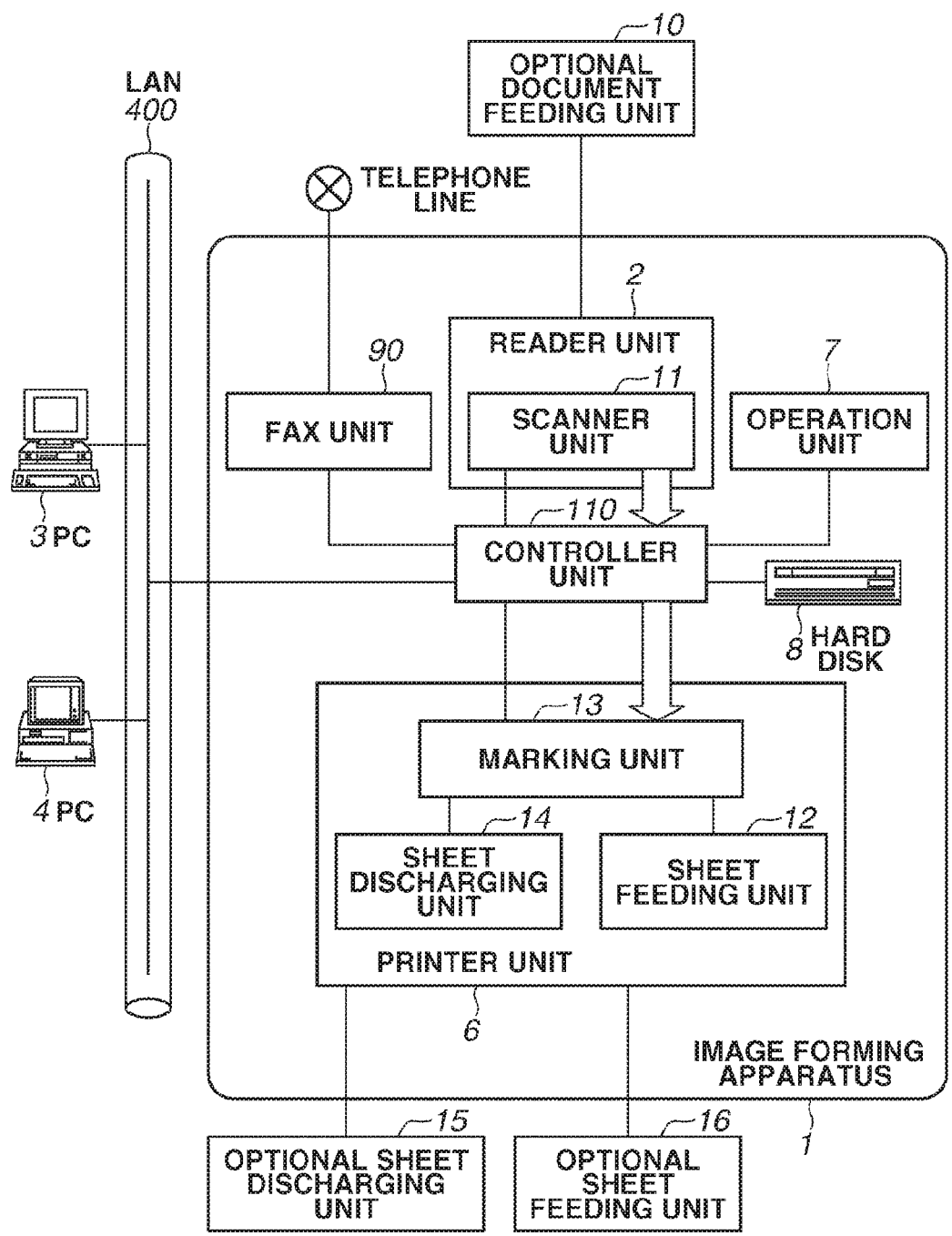
FIG. 1 is a block diagram illustrating a configuration of an image forming apparatus.

The following describes a first exemplary embodiment. FIG. 1 is a block diagram illustrating a configuration of an image forming apparatus.

An image forming apparatus 1 is connected to PCs 3 and 4 via a local area network (LAN) 400.

The image forming apparatus 1 includes a reader unit 2, a printer unit 6, an operation unit 7, a hard disk 8, a facsimile (fax) unit 90, and a controller unit 110.

The reader unit 2 reads a document (a sheet) to input image data. The reader unit 2 includes an optional document feeding unit 10 and a scanner unit 11. The optional document feeding unit 10 conveys the document. The optional document feeding unit 10 is configured such that the optional document feeding unit 10 is attachable to the reader unit 2. The scanner unit 11 optically reads the conveyed document to convert the document into image data in the form of electrical signals.

The printer unit 6 executes printing on a sheet based on the image data. The printer unit 6 includes a sheet feeding unit 12, a marking unit 13, and a sheet discharging unit 14. The sheet feeding unit 12 includes a plurality of sheet cassettes for storing recording sheets (sheets). The marking unit 13 transfers and fixes the image data onto a recording sheet. The sheet discharging unit 14 executes sorting processing and stapling processing on the printed recording sheet and then discharges the printed recording sheet to the outside. The printer unit 6 is configured such that an optional sheet discharging unit 15 and an optional sheet feeding unit 16 can additionally be connected to the printer unit 6 afterward to expand functions and can be removed from the printer unit 6.

The operation unit 7 receives various user's instructions via keys. The operation unit 7 also notifies a user of various types of information via a panel.

The hard disk 8 stores control programs and image data.

The fax unit 90 executes facsimile input and output processing.

Although the optional document feeding unit 10, the optional sheet discharging unit 15, and the optional sheet feeding unit 16 are described as optional units, the present exemplary embodiment is not limited to these optional units. For example, the fax unit may be an optional unit, or other hardware such as an extended memory may be added as an optional unit.

The controller unit 110 is connected to components, such as the reader unit 2, the printer unit 6, the operation unit 7, the hard disk 8, and the fax unit 90, to control each component.

Figure 2:
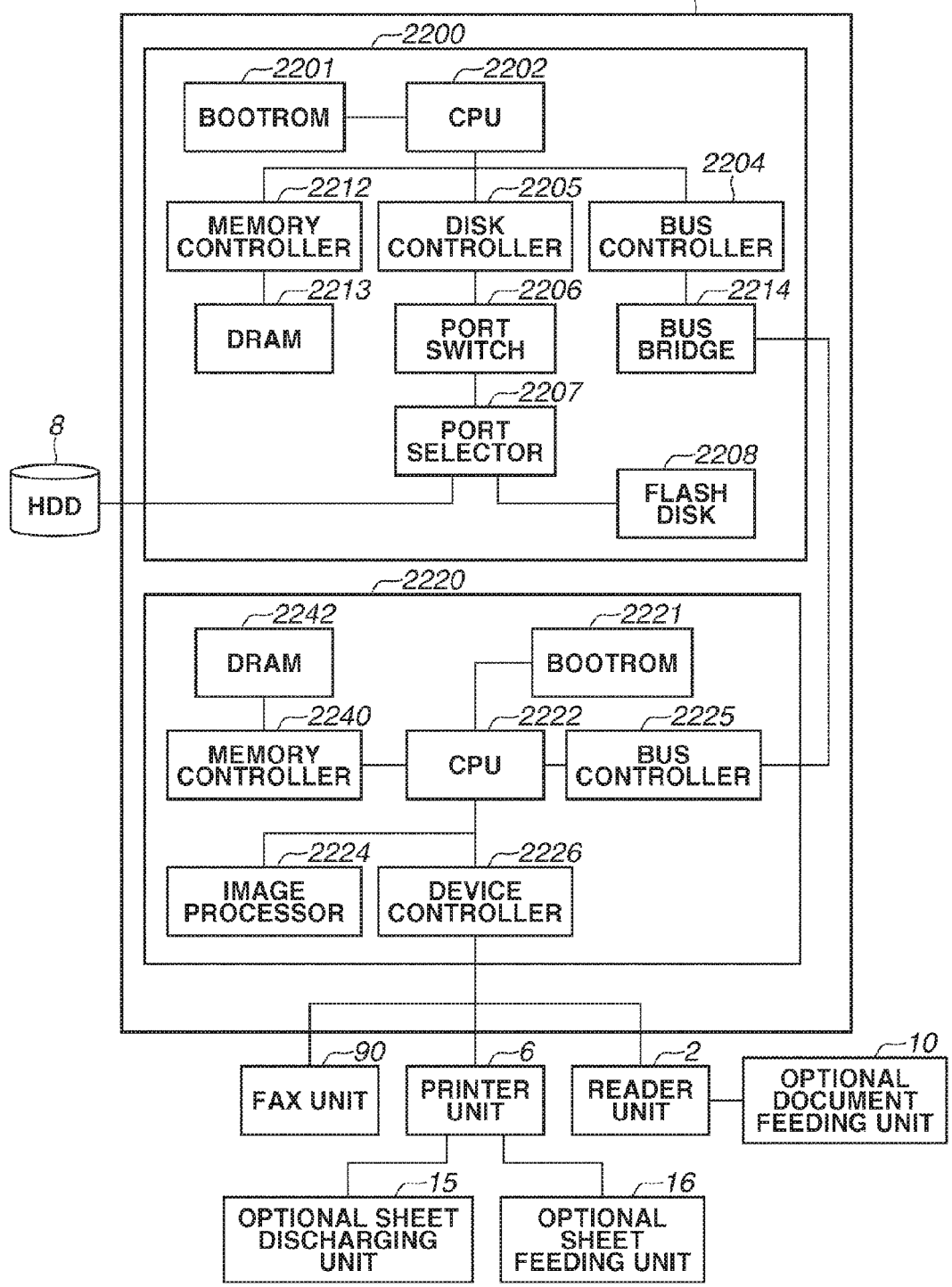
FIG. 2 is a block diagram illustrating a configuration of a controller unit.

FIG. 2 is a block diagram illustrating a configuration of the controller unit 110.

The controller unit 110 mainly includes a main board 2200 and a sub-board 2220. The main board 2200 handles ordinary information processing. The sub-board 2220 handles image formation processing. The main board 2200 and the sub-board 2220 may be formed as a single board.

The main board 2200 includes a boot read only memory (ROM) 2201, a central processing unit (CPU) 2202, a bus controller 2204, a disk controller 2205, a port switch 2206, a port selector 2207, and a flash disk 2208. The main board 2200 also includes a memory controller 2212, a dynamic random access memory (DRAM) 2213, and a bus bridge 2214.

The boot ROM 2201 is a nonvolatile storage medium and stores boot programs.

The CPU 2202 executes a boot program, an operating system (OS), and an application program.

The bus controller 2204 controls transmission and reception of data between the main board 2200 and the sub-board 2220.

The disk controller 2205 controls the hard disk 8 via the port switch 2206 and the port selector 2207.

The port switch 2206 switches on/off access via the port selector 2207 in response to a command from the CPU 2202.

The port selector 2207 connects the flash disk 2208 and the hard disk 8 together and selects the flash disk 2208 or the hard disk 8 as an access destination.

The flash disk 2208 is a nonvolatile storage medium and stores an OS and an application program.

The memory controller 2212 controls the DRAM 2213.

The DRAM 2213 is a volatile storage medium and temporarily stores a program and image data to be used by the CPU 2202.

The bus bridge 2214 relays data between the bus controller 2204 and a bus controller 2225.

The sub-board 2220 includes a boot ROM 2221, a CPU 2222, a DRAM 2242, and a memory controller 2240.

The boot ROM 2221 is a nonvolatile storage medium and stores a boot program.

The CPU 2222 executes a boot program, an OS, and an application program.

The memory controller 2240 controls the DRAM 2242.

The DRAM 2242 is a volatile storage medium and temporarily stores a program and image data to be used by the CPU 2222.

An image processor 2224 executes various types of image processing on image data.

The bus controller 2225 controls transmission and reception of data between the main board 2200 and the sub-board 2220.

A device controller 2226 controls the reader unit 2, the printer unit 6, and the fax unit 90.

The operation unit 7 is connected to the CPU 2202 via a bus that is not illustrated.

The controller unit 110 includes a network interface controller (NIC), which is not illustrated, in the main board 2200 or in the sub-board 2220 to be communicable with the PC3 and the PC4 via the LAN 400.

As to a power supply system, power is supplied to the image forming apparatus 1 from a commercial power source via a rocker switch. The power supply system is divided into an primary group including the main board 2200 and a secondary group including the sub-board 2220. During a sleep state 304, which will be described below, power is supplied to the primary group while no power is supplied to the secondary group. When the rocker switch is off, the image forming apparatus 1 is in a suspended state 305, which will be described below. In the suspended state, power can be supplied only to the DRAM 2213.

Figure 3:
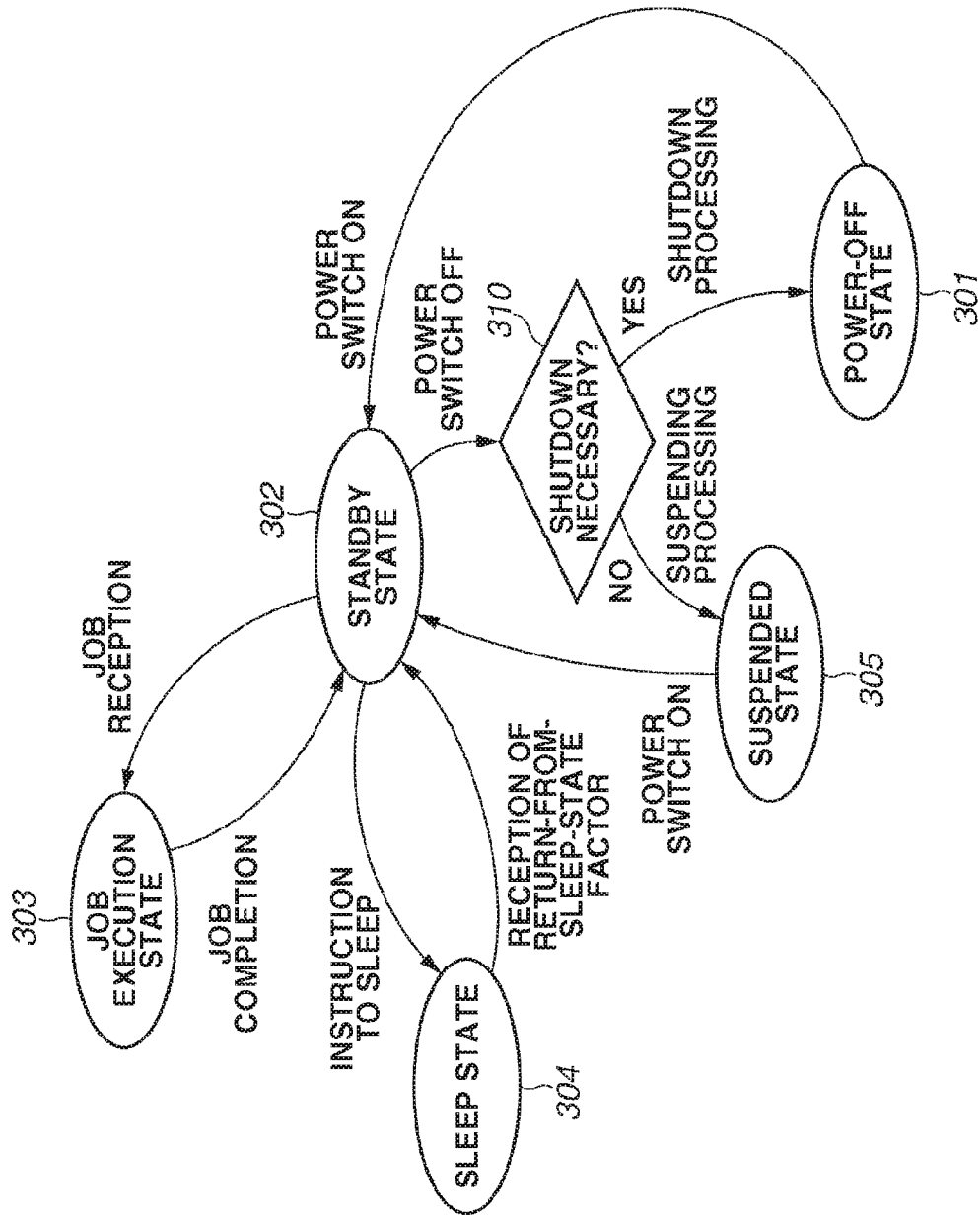
FIG. 3 is a state transition diagram illustrating power states of the image forming apparatus.

FIG. 3 is a state transition diagram illustrating transitions between power states of the image forming apparatus 1.

The image forming apparatus 1 is operable in one of the power states.

The power states of the image forming apparatus 1 include a power-off state 301, a standby state 302, a job execution state 303, the sleep state 304, and the suspended state 305.

The power states in descending order of power consumption are as follows: the job execution state 303>the standby state 302>the sleep state 304>the suspended state 305>the power-off state 301.

The power-off state 301 (an example of a third power state or power-off state) refers to a state in which the power switch of the image forming apparatus 1 is off, and the supply of power to every component of the image forming apparatus 1 is stopped. When a user turns on the power switch in the power-off state 301, the image forming apparatus 1 is shifted to the standby state 302.

The standby state 302 (an example of a first power state) refers to a state in which the image forming apparatus 1 is waiting for job execution, and power is supplied to every component of the image forming apparatus 1. In the standby state 302, however, it is not necessary to supply power to every component of the image forming apparatus 1. Power may be supplied only to essential components but not to the rest of the components (e.g., the operation unit 7). When the image forming apparatus 1 in the standby state 302 receives a job from the PC 3, the image forming apparatus 1 is shifted to the job execution state 303. When the image forming apparatus 1 in the standby state 302 receives an instruction to sleep, the image forming apparatus 1 is shifted to the sleep state 304. Examples of the instruction to sleep include pressing of a shift-to-sleep-state button by a user and passing of a predetermined period in the standby state 302. When a user turns off the power switch in the standby state 302, the necessity of a shutdown is determined in step 310. If a shutdown is necessary, then shutdown processing is executed to shift the image forming apparatus 1 to the power-off state 301. If a shutdown is not necessary, then suspending processing is executed to shift the image forming apparatus 1 to the suspended state 305. The shutdown processing refers to processing in which an OS and an application are terminated to terminate the image forming apparatus 1. The suspending processing refers to processing in which the image forming apparatus 1 is suspended while the supply of power to the DRAM 2213 is continued to retain memory images (including information on the state of the image forming apparatus 1) stored in the DRAM 2213. The suspended state 305 refers to a state in which the image forming apparatus 1 is paused, and the supply of power to the DRAM 2213 is continued to retain information on the state of the image forming apparatus 1 stored in the DRAM 2213. Instead of the suspending processing, hibernation processing (pause processing in which data stored in the DRAM 2213 is saved in the hard disk 8, the supply of power to the DRAM 2213 is stopped, and the image forming apparatus 1 is paused) may be employed. In the hibernation, a nonvolatile storage medium other than the hard disk 8 may be used. The hibernation processing refers to processing in which memory images (including the state of the image forming apparatus 1) stored in the DRAM 2213 are saved in the hard disk 8 to retain the memory images and the image forming apparatus 1 is paused. A hibernation state refers to a state in which the image forming apparatus 1 is paused. In the hibernation state, although the supply of power to the hard disk 8 is stopped, since the hard disk 8 is a nonvolatile storage medium, the state of the image forming apparatus 1 stored in the hard disk 8 is retained. Determination of the necessity of a shutdown will be described below. A target of the suspending processing (a non-volatile memory for which the supply of power is continued to retain data during the suspended state 305) may include not only the DRAM 2213 but also the DRAM 2242. Alternatively, only the DRAM 2213 may be the target of the suspending processing, and data stored in the DRAM 2242 may be saved in the DRAM 2213.

The job execution state 303 refers to a state in which the image forming apparatus 1 is executing a job, and power is supplied to every component of the image forming apparatus 1. Even in the job execution state 303, however, it is not always necessary to supply power to every component of the image forming apparatus 1. Power may be supplied only to essential components but not to the rest of the components (e.g., the operation unit 7). When the image forming apparatus 1 in the job execution state 303 completes the job, the image forming apparatus 1 is shifted to the standby state 302.

The sleep state 304 refers to a state in which the image forming apparatus 1 is standing by under a power saving condition. In the sleep state 304, while power is supplied to the controller unit 110 among the components of the image forming apparatus 1, the supply of power to the reader unit 2, the printer unit 6, and the operation unit 7 is stopped. When the image forming apparatus 1 in the sleep state 304 receives a return-from-sleep-state factor, the image forming apparatus 1 is shifted to the standby state 302. Examples of the return-from-sleep-state factor include pressing of a return-from-sleep-state button of the operation unit 7 by a user and reception of a job from the PC 3. The power states of the image forming apparatus 1 may further include a deep sleep state, which is not illustrated. The deep sleep state refers to a state in which predetermined conditions are satisfied in the sleep state 304. The deep sleep state is different from the sleep state 304 in components of the controller unit 110 to which power is supplied. For example, the supply of power to the sub-board 2220 is stopped in the deep sleep state. The deep sleep state is also different from the suspended state 305 in components of the controller unit 110 to which power is supplied. For example, the supply of power to the network interface, which is not illustrated, is continued in the deep sleep state.

The suspended state 305 (an example of a second power state or power-saving state) refers to a state in which the image forming apparatus 1 is standing by to be ready for high-speed activation. In the suspended state 305, power is supplied to the DRAM 2213 among the components of the image forming apparatus 1, and the supply of power to the rest of the components is stopped. When a user turns on the power switch in the suspended state 305, resume processing is executed to shift the image forming apparatus 1 to the standby state 302. The resume processing refers to processing to return the image forming apparatus 1 to a former state of the image forming apparatus 1 before being suspended by use of information stored in the DRAM 2213 in the suspending processing (information having been stored in the DRAM 2213 that is saved in the hard disk 8 in the hibernation processing).

When a user turns on the power switch, the CPU 2202 determines whether the image forming apparatus 1 is waking up from the power-off state 301 or from the suspended state 305 (or the hibernation state). If the image forming apparatus 1 is waking up from the power-off state 301, then the CPU 2202 executes normal activation processing. If the image forming apparatus 1 is waking up from the suspended state 305 (or the hibernation state), then the CPU 2202 executes the resume processing.

Figure 4:
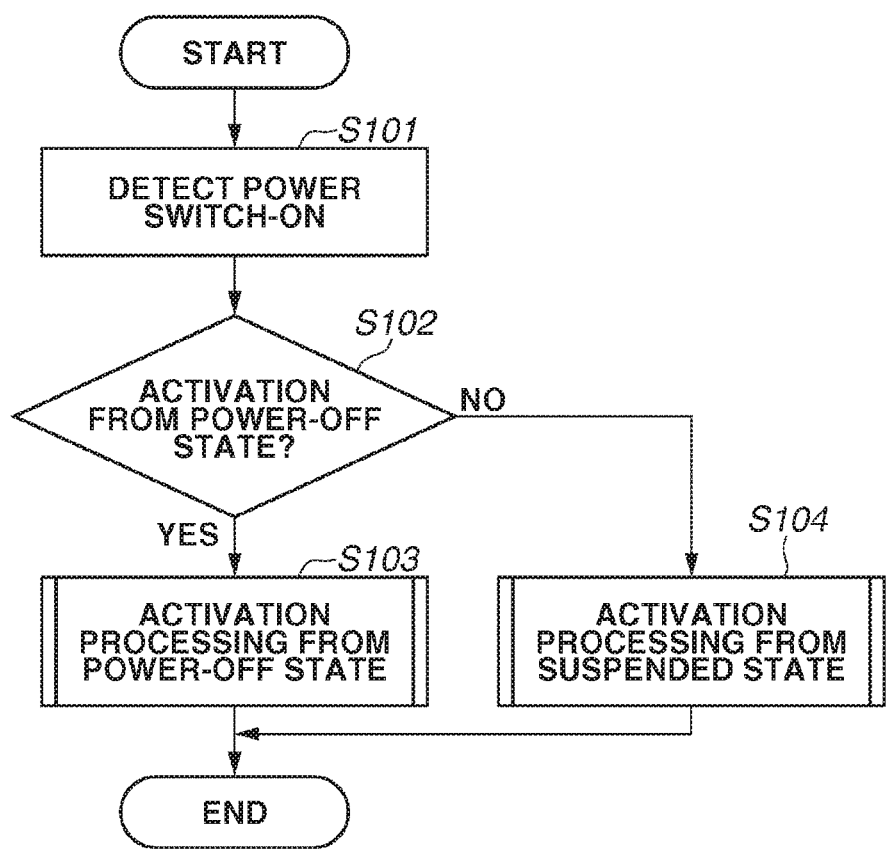

FIG. 4 is a flow chart illustrating an operation at the time when the power switch of the image forming apparatus 1 is turned on. The CPU 2202 reads a program stored in the hard disk 8 or in the boot ROM 2201 into the DRAM 2213 to execute the program, so that the operation is realized.

In step S101, the CPU 2202 detects a user's operation to turn on the power switch.

In step S102, the CPU 2202 determines whether the image forming apparatus 1 is activated from the power-off state 301. Specifically, the CPU 2202 accesses the hard disk 8 or the DRAM 2213. If the hard disk 8 or the DRAM 2213 does not store information indicating that the image forming apparatus 1 has been in the suspended state 305 (or the hibernation state), then the CPU 2202 determines that the image forming apparatus 1 is to be activated from the power-off state 301. If the hard disk 8 or the DRAM 2213 stores information indicating that the image forming apparatus 1 has been in the suspended state 305 (or the hibernation state), then the CPU 2202 determines that the image forming apparatus 1 is not to be activated from the power-off state 301. If YES in step S102, then the processing proceeds to step S103. If NO in step S102, then the processing proceeds to step S104.

In step S103, the CPU 2202 executes activation processing from the power-off state 301. Details of the activation processing will be described below with reference to FIG. 5.

In step S104, the CPU 2202 executes activation processing from the suspended state 305 (or the hibernation state). Details of the activation processing will be described below with reference to FIG. 6.

Figure 5:
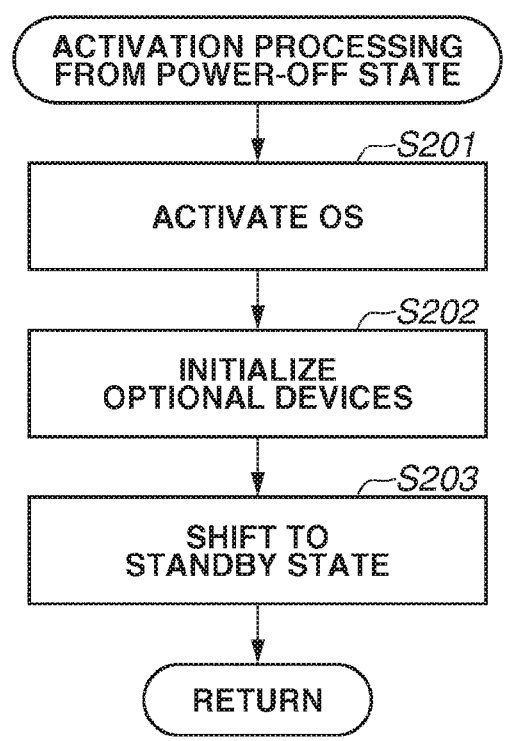
FIG. 5 is a flow chart illustrating activation processing from a power-off state.

FIG. 5 is a flow chart illustrating the activation processing from the power-off state 301. The activation processing describes details of step S103 illustrated in FIG. 4. The CPU 2202 reads a program stored in the hard disk 8 or the boot ROM 2201 into the DRAM 2213 to execute the program, so that the activation processing is realized.

In step S201, the CPU 2202 activates an OS to enable the CPU 2202 and the CPU 2222 to execute various controls.

In step S202, the CPU 2202 executes initialization processing via the CPU 2222 to initialize the reader unit 2 including the optional device and the printer unit 6 including the optional devices. In the initialization processing, the reader unit 2 determines whether the optional document feeding unit 10 is connected to the reader unit 2. If the optional document feeding unit 10 is connected to the reader unit 2, then the reader unit 2 notifies the controller unit 110 of necessary control information including the model name, detailed configuration information, and operation speed of the detected optional document feeding unit 10. Similarly, the printer unit 6 determines whether the optional sheet discharging unit 15 and the optional sheet feeding unit 16 are connected to the printer unit 6, collects detailed information, and notifies the controller unit 110 of the information. The CPU 2202 initializes each device and the controller unit 110 based on the configuration information notified by the reader unit 2 and the printer unit 6.

In step S203, the CPU 2202 shifts the power state of the image forming apparatus 1 to the standby state 302.

Figure 6:
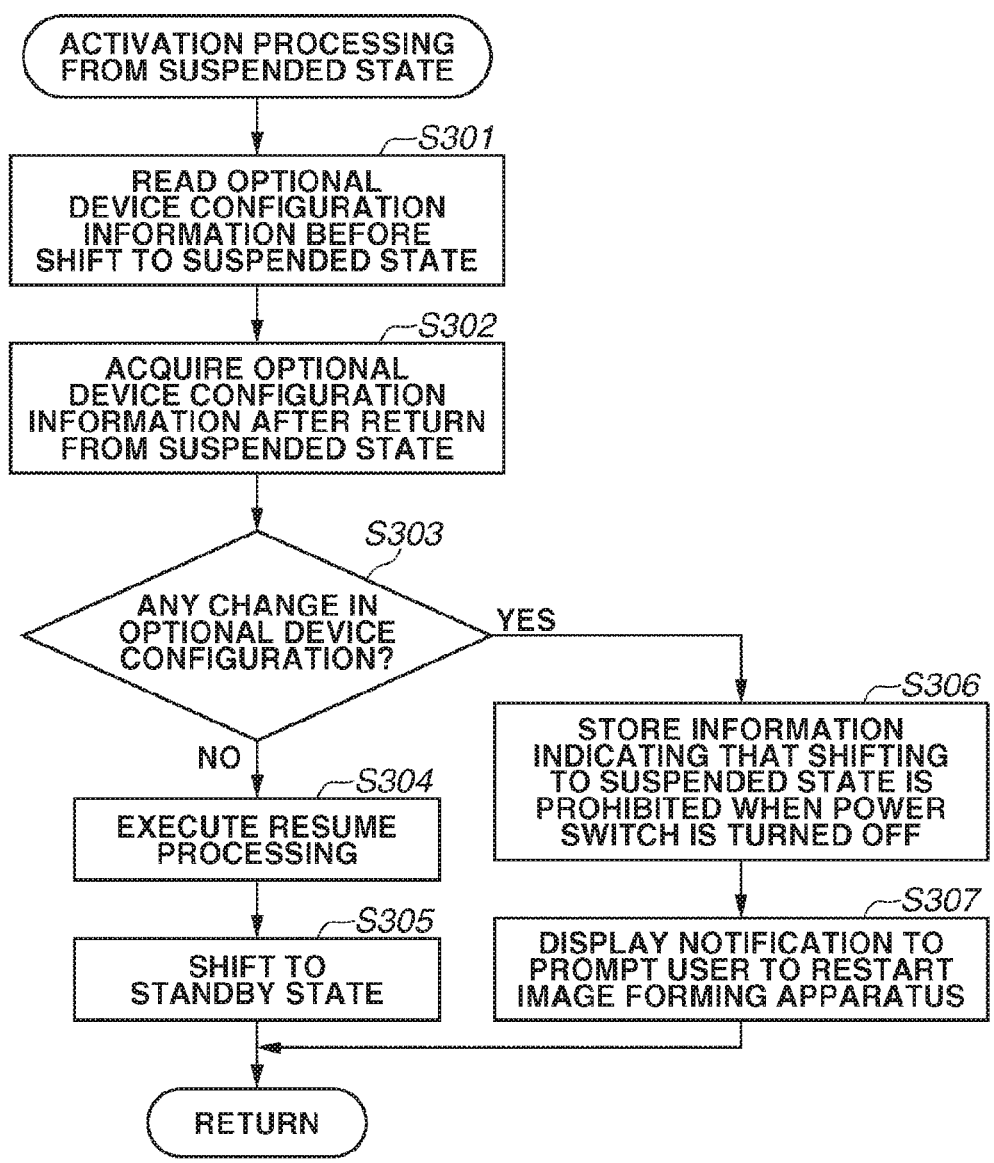
FIG. 6 is a flow chart illustrating activation processing from a suspended state.

FIG. 6 is a flow chart illustrating the activation processing from the suspended state 305 (or the hibernation state). The activation processing describes details of step S104 illustrated in FIG. 4. The CPU 2202 reads a program stored in the hard disk 8 or the boot ROM 2201 into the DRAM 2213 to execute the program, so that the activation processing is realized.

In step S301, the CPU 2202 reads optional device configuration information on the optional devices before the shift to the suspended state 305 (or the hibernation state), which is stored in the DRAM 2213 or the hard disk 8. The optional device configuration information refers to information indicating details of each optional device. Specific examples include a media access control (MAC) address, serial number, type of device, name of manufacturer, name of series, and name of model of each device. Storage of optional device configuration information in the DRAM 2213 will be described in step S602 illustrated in FIG. 9.

In step S302, the CPU 2202 acquires current optional device configuration information (optional device configuration information after the return from the suspended state 305) from each optional unit via the CPU 2222 (an example of a second acquisition unit).

In step S303, the CPU 2202 compares the optional device configuration information read in step S301 with the optional device configuration information acquired in step S302 to determine whether there has been any change in the optional device configuration during the suspended state 305 (or the hibernation state). Specifically, if the optional device configuration information read in step S301 is consistent with the optional device configuration information acquired in step S302, then the CPU 2202 determines that there has been no change in the optional device configuration during the suspended state 305 (or the hibernation state). If the optional device configuration information read in step S301 is inconsistent with the optional device configuration information acquired in step S302, then the CPU 2202 determines that there has been a change in the optional device configuration during the suspended state 305 (or the hibernation state). If NO in step S303, then the processing proceeds to step S304. If YES in step S303, then the processing proceeds to step S306.

In step S304, the CPU 2202 executes the resume processing.

In step S305, the CPU 2202 shifts the power state of the image forming apparatus 1 to the standby state 302.

In step S306, the CPU 2202 stores in the hard disk 8 or the DRAM 2213 information indicating that shifting to the suspended state 305 (or the hibernation state) is prohibited when a user turns off the power switch next time. Accordingly, regardless of the specification setting for the time when the power switch is turned off, the image forming apparatus 1 is shifted to the power-off state 301 when a user turns off the power switch in response to the notification given in step S307. Thus, the image forming apparatus 1 can be restarted as appropriate. The information may be invalidated when the image forming apparatus 1 is shifted to the power-off state 301 next time or when a predetermined period has elapsed.

In step S307, the CPU 2202 displays a notification on a display screen of the operation unit 7 to prompt the user to restart the image forming apparatus 1.

Accordingly, even when the CPU 2202 executes the activation from the suspended state 305, the CPU 2202 may not load the image stored in the DRAM to execute the resume processing at once depending on the status of each optional unit. This enables the image forming apparatus 1 to respond to a change in the configuration of the optional units that has been made during the suspended state 305.

Figure 7:
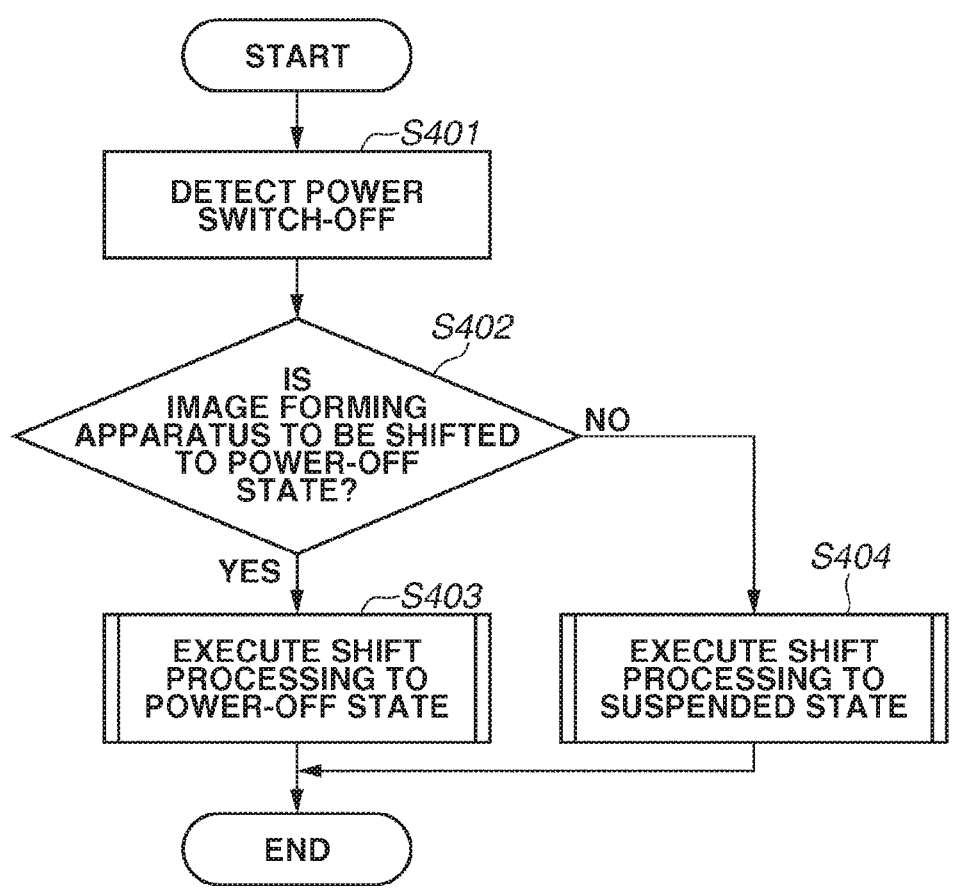
FIG. 7 is a flow chart illustrating an operation at the time when the power switch of the image forming apparatus is turned off.

FIG. 7 is a flow chart illustrating an operation at the time when the power switch of the image forming apparatus 1 is turned off. The CPU 2202 reads a program stored in the hard disk 8 or the boot ROM 2201 into the DRAM 2213 to execute the program, so that the operation is realized.

In step S401, the CPU 2202 detects a user's operation to turn off the power switch.

In step S402, the CPU 2202 determines whether the image forming apparatus 1 is to be shifted to the power-off state 301. Specifically, if the specification setting is set such that the image forming apparatus 1 is to be shifted to the power-off state 301 when the power switch of the image forming apparatus 1 is turned off, then the CPU 2202 determines that the image forming apparatus 1 is to be shifted to the power-off state 301. If the specification setting is set such that the image forming apparatus 1 is to be shifted to the suspended state 305 (or the hibernation state) when the power switch of the image forming apparatus 1 is turned off, then the CPU 2202 determines that the image forming apparatus 1 is not to be shifted to the power-off state 301. Even if the image forming apparatus 1 is set to be shifted to the suspended state 305 (or the hibernation state), the CPU 2202 accesses the hard disk 8 or the DRAM 2213 to perform control as follows. If neither the hard disk 8 nor the DRAM 2213 stores the information stored in step S306, then the CPU 2202 determines that the image forming apparatus 1 is not to be shifted to the power-off state 301. If the hard disk 8 or the DRAM 2213 stores the information stored in step S306, then the CPU 2202 determines that the image forming apparatus 1 is to be shifted to the power-off state 301. If YES in step S402, then the processing proceeds to step S403. If NO in step S403, then the processing proceeds to step S404.

In step S403, the CPU 2202 executes shift processing to the power-off state 301. Details of the shift processing will be described below with reference to FIG. 8.

In step S404, the CPU 2202 executes shift processing to the suspended state 305 (or the hibernation state). Details of the shift processing will be described below with reference to FIG. 9.

Figure 8:
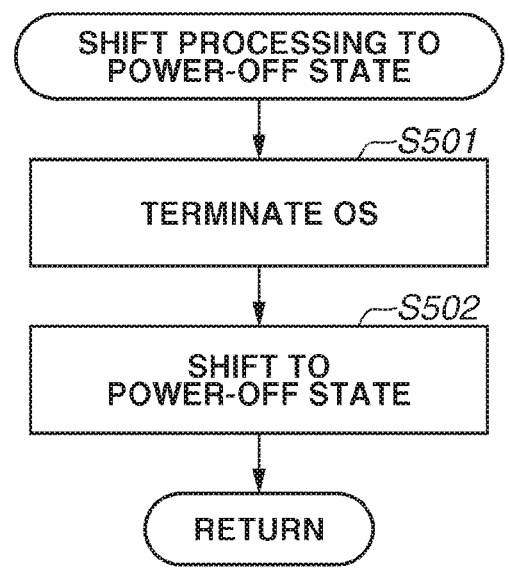
FIG. 8 is a flow chart illustrating shift processing to the power-off state.

FIG. 8 is a flow chart illustrating the shift processing to the power-off state 301. The shift processing describes details of step S403 illustrated in FIG. 7. The CPU 2202 reads a program stored in the hard disk 8 or the boot ROM 2201 into the DRAM 2213 to execute the program, so that the shift processing is realized.

In step S501, the CPU 2202 terminates the OS. This is shutdown processing.

In step S502, the CPU 2202 shifts the power state of the image forming apparatus 1 to the power-off state 301.

Figure 9:
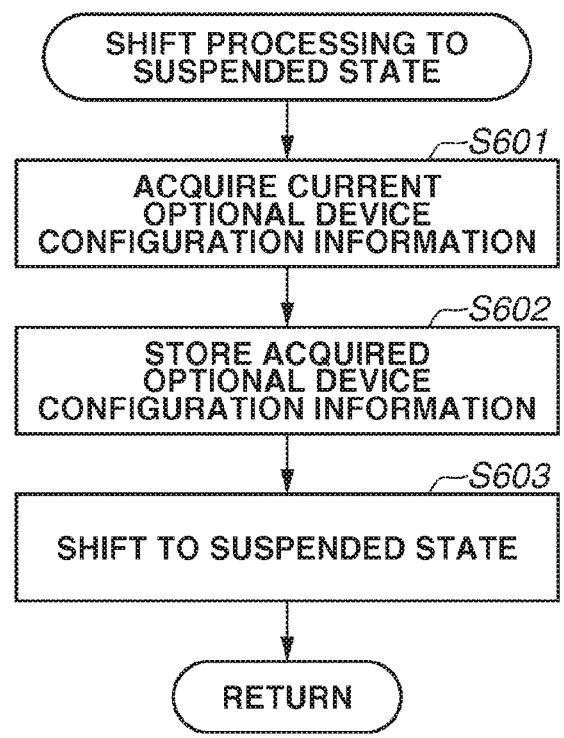
FIG. 9 is a flow chart illustrating shift processing to the suspended state.

FIG. 9 is a flow chart illustrating the shift processing to the suspended state 305 (or the hibernation state). The shift processing describes details of step S404 illustrated in FIG. 7. The CPU 2202 reads a program stored in the hard disk 8 or the boot ROM 2201 into the DRAM 2213 to execute the program, so that the shift processing is realized.

In step S601, the CPU 2202 acquires current optional device configuration information (optional device configuration information before the shift to the suspended state 305) from each optional unit via the CPU 2222 (an example of a first acquisition unit).

In step S602, the CPU 2202 stores in the DRAM 2213 or the hard disk 8 the optional device configuration information (optional device configuration information before the shift to the suspended state 305) acquired in step S601.

In step S603, the CPU 2202 shifts the power state of the image forming apparatus 1 to the suspended state 305 (or the hibernation state). At this time, the CPU 2202 accesses the hard disk 8 or the DRAM 2213 to store information for use in the next activation that indicates that the former state is the suspended state 305 (or the hibernation state).

Although the foregoing describes that mainly a single CPU (the CPU 2202) executes processing, a plurality of CPUs may share execution of the processing.

According to the present exemplary embodiment, an optional device can be controlled as appropriate even when the optional device is installed or removed during the suspended state 305 (or the hibernation state). Furthermore, when neither installation nor removal of an optional device has been performed, the image forming apparatus 1 is resumed from the standby state 302 to enable high-speed activation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
    a storing device that stores store settings of a pre-set power state to which the image forming apparatus is to be shifted in a case where an operation to turn off a power switch is detected;
    a memory device that stores a set of instructions; and
    at least one processor that executes the instructions to:
    determine, if the image forming apparatus is returned from a suspended state, whether there has been a change of an optional device attached to the image forming apparatus, the change of the optional device being at least one of an installation of a new optional device on the image forming apparatus, a removal of an optional device from the image forming apparatus, an addition of a new optional device, and a replacement of an optional device;
    shift, in response to a detection of the operation to turn off the power switch, the power state of the image forming apparatus from a standby state to the power-off state even if the suspended state is set as the pre-set power state to which the image forming apparatus is to be shifted, in a case where it is determined that there has been the installation of the new optional device on the image forming apparatus, the removal of the optional device from the image forming apparatus, the addition of the new optional device, or the replacement of the optional device; and
    execute, in a case where the image forming apparatus is activated from the power-off state, acquisition of information about one or more optional devices attached to the image forming apparatus, the acquired information including at least one of a model name, configuration information, and operation speed of the one or more optional devices attached to the image forming apparatus;
    initialize, based on the acquired information about the one or more optional device, at least one of the processor and the one or more optional devices.

2. The image forming apparatus according to claim 1, wherein the at least one processor executes the instructions in the memory device to:
    acquire, before the image forming apparatus is shifted to the suspended power state, information about the optional device attached to the image forming apparatus;
    store, in a storage unit, the information acquired before the image forming apparatus is shifted to the suspended power state; and
    acquire, after the image forming apparatus is returned from the suspended state, information about the optional device attached to the image forming apparatus, and
    determine that there has been the change of the optional device attached to the image forming apparatus, in a case where the information stored in the storage unit is inconsistent with the information acquired after the image forming apparatus is returned from the suspended state.

3. The image forming apparatus according to claim 1, wherein the at least one processor executes instructions in the memory device to prompt a user to restart the image forming apparatus in a case where it is determined that there has been the installation of the new optional device on the image forming apparatus, the removal of the optional device from the image forming apparatus, the addition of the new optional device, or the replacement of the optional device.

4. The image forming apparatus according to claim 1, wherein the at least one processor executes instructions in the memory device to execute a shutdown process to shift the image forming apparatus from the standby state to the power-off state.

5. The image forming apparatus according to claim 1, wherein the at least one processor executes instructions in the memory device to:
    store, a volatile storage medium, status information of the image forming apparatus,
    wherein the volatile storage medium is configured to hold the status information during the suspended state, the held status information being stored before the image forming apparatus shifts from the standby state to the suspended state.

6. The image forming apparatus according to claim 5, wherein:
    the at least one processor includes a central processing unit (CPU), the volatile storage medium is configured to temporarily store a program and image data to be used by the CPU; and the volatile storage medium is configured to hold a memory image of the volatile storage medium during the suspended state, the held memory image includes the program and the image data to be used by the CPU.

7. The image forming apparatus according to claim 1, wherein:

the storage is a non-volatile storage medium, wherein the at least one processor executes instructions in the memory device to store, in a volatile storage medium, status information of the image forming apparatus;

wherein the non-volatile storage medium is configured to hold the status information during the suspended state, the held status information being transferred from the volatile storage medium to the non-volatile storage medium and saved in the non-volatile storage medium before the image forming apparatus shifts from the standby state to the suspended state.

8. A method for controlling an image forming apparatus, the method comprising:

storing settings of a pre-set power state to which the image forming apparatus is to be shifted in a case where an operation to turn off a power switch is detected;

determining, if the image forming apparatus is returned from a suspended state, whether there has been a change of an optional device attached to the image forming apparatus, the change of the optional device being at least one of an installation of a new optional device on the image forming apparatus, a removal of an optional device from the image forming apparatus, an addition of a new optional device, and a replacement of an optional device;

shifting, in response to a detection of the operation to turn off the power switch, the power state of the image forming apparatus from a standby state to the power-off state even if the suspended state is set as the pre-set power state to which the image forming apparatus is to be shifted, in a case where it is determined that there has been the installation of the new optional device on the image forming apparatus, the removal of the optional device from the image forming apparatus, the addition of the new optional device, or the replacement of the optional device;

executing, in a case where the image forming apparatus is activated from the power-off state, acquisition of information about one or more optional devices attached to the image forming apparatus, the acquired information including at least one of a model name, configuration information, and operation speed of the one or more optional devices attached to the image forming apparatus; and initializing, based on the acquired information about the one or more option devices, at least one of the processor and the one or more optional devices.

9. The method according to claim 8, wherein acquiring, before the image forming apparatus is shifted to the suspended power state, first information about the optional device attached to the image forming apparatus;

storing, in a storage unit, the acquired first information; and acquiring, after the image forming apparatus is returned from the suspended state, second information about the optional device attached to the image forming apparatus, wherein it is determined in the determining that there has been the change of the optional device attached to the image forming apparatus, in a case where the first information stored in the storage unit is inconsistent with the acquired second information.

10. The method according to claim 8, further comprising: prompting a user to restart the image forming apparatus in a case where it is determined in the determining that there has been the installation of the new optional device on the image forming apparatus, the removal of the optional device from the image forming apparatus, the addition of the new optional device, or the replacement of the optional device.

11. A non-transitory computer-readable storage medium storing a program that causes a computer to execute a method for controlling an information processing apparatus, to which an external device is attachable, the method comprising:

determining, if the image forming apparatus is returned from a suspended state, whether there has been a change of an optional device attached to the image forming apparatus, the change of the optional device being at least one of an installation of a new optional device on the image forming apparatus, a removal of an optional device from the image forming apparatus, an addition of a new optional device, and a replacement of an optional device;

shifting, in response to a detection of the operation to turn off a power switch, the power state of the image forming apparatus from a standby state to the power-off state even if the suspended state is set as the pre-set power state to which the image forming apparatus is to be shifted, in a case where it is determined that there has been the installation of the new optional device on the image forming apparatus, the removal of the optional device from the image forming apparatus, the addition of the new optional device, or the replacement of the optional device;

executing, in a case where the image forming apparatus is activated from the power-off state, acquisition of information about one or more optional devices attached to the image forming apparatus, the acquired information including at least one of a model name, configuration information, and operation speed of the one or more optional devices attached to the image forming apparatus; and initializing, based on the acquired information about the one or more optional devices, at least one of the processor and the one or more optional devices.

* * * * *